Patented June 15, 1954

2,681,325

UNITED STATES PATENT OFFICE 2,681,325

FIBER-FORMING SPINNING COMPOSITION

Nelson W. Abernethy, Midland, Mich., assignor to The Dow Chemical Company, Midland, Mich., a corporation of Delaware No Drawing. Application October 8, 1952, Serial No. 313,777

4 Claims. (Cl. 260—32.8)

This invention relates to a fiber-forming spinning dope. It relates specifically to an acetone solution of a particular copolymer of acrylonitrile and vinylidene chloride.

It is known that most fiber-forming copolymers of acrylonitrile are substantially insoluble in the more common organic solvents, and that, in general, they are unaffected by acetone. Similarly, it is known that most fiber-forming copolymers of vinylidene chloride are insoluble in the common solvents such as acetone. It has been considered, in the past, that the fiber-forming copolymers of vinylidene chloride are those containing 75 to 90 per cent or more of vinylidene chloride, as such copolymers commonly exhibit submicroscopic crystallinity and fibering tendencies. The properties of acrylonitrile copolymers and of vinylidene chloride copolymers make it highly desirable to be able to produce fibers from a copolymer of acrylonitrile and vinylidene chloride. To be of interest in the commercial manufacture of fibers, however, the fiber-forming copolymer should be readily soluble to form 10 to 20 per cent solutions in a cheap and volatile solvent. So that the fiber making process may be either that of wet spinning or that of dry spinning, the solvent used in the spinning dope should be readily miscible with water or other liquid precipitant for the copolymer and should have a low boiling point and be readily condensible. Acetone meets these requirements admirably, and it would be highly desirable to provide a fiber-forming spinning dope of a copolymer of acrylonitrile and vinylidene chloride, dissolved in acetone. It is the principal object of this invention to provide such a composition.

It has now been found that a narrow range of acrylonitrile-vinylidene chloride copolymers can be dissolved to form 10 to 20 per cent solutions in acetone and that such solutions can be spun to form useful fibers. The useful copolymers contain less acrylonitrile than is usually deemed necessary in fiber-forming acrylonitrile copolymers and they contain much less vinylidene chloride than has heretofore been deemed necessary in fiber-forming vinylidene chloride copolymers. The useful copolymers are those which contain from 30 to 55 per cent by weight of acrylonitrile and from 70 to 45 per cent of vinylidene chloride. The optimum results are obtained with the copolymer of 40 per cent acrylonitrile and 60 per cent vinylidene chloride. The copolymer used should be one of fairly high molecular weight.[1] Specifically, it should be one of which 0.5 gram dissolved in 100 milliliters of dimethyl formamide gives the solution a viscosity, measured at 25° C., of at least 1.5 centipoises and not to exceed 2.5 centipoises. The best fibers are made from the copolymers whose viscosity, measured as described above, is between 1.8 to 2.2 centipoises.

The solutions of the invention can be made by stirring together the defined copolymer and acetone in ratios to provide solutions containing 10 to 20 per cent by weight of the copolymer. Solution occurs at room temperature with good agitation, and less stirring is needed when the acetone is warmed to 35°–45° C.

It has been found that the acetone solution of the invention can be dry spun to form fibers in an evaporative atmosphere. It is preferred, however, to make fibers from the solution by wet spinning into water, dilute aqueous acid or dilute aqueous salt solution. The spinning bath may be at or near room temperature, but better results are obtained when the bath is at a temperature near 50° C., to accelerate the liberation of acetone from the fibers. The fibers may be stretched in the spinning bath, but most of the stretching is done after the fibers leave that bath, and may be effected in air or in later aqueous baths or in steam. Depending on the amount of orientation effected by stretching, the properties of the fibers vary considerably. Thus, at low degrees of orientation (stretch ratios up to about 4) the fibers have tenacities near 2 to 3 grams per denier and are capable of 18 to 25 per cent elongation. When stretch ratios from 4 to 10 are employed, the fibers have tenacities of 3 to 5 grams per denier and are capable of 10 to 18 per cent elongation, with good recovery characteristics after elongation.

In a specific example, the copolymer employed was made from 40 per cent acrylonitrile and 60 per cent vinylidene chloride, by weight. A solution of 0.5 gram of this copolymer in 100 milliliters of dimethyl formamide had a viscosity of

[1] The molecular weights referred to herein are determined from the absolute viscosity of the standard solutions, based on the formula published by R. C. Houtz in Textile Research Journal, 20, 786 (1950):

$$N = KM^a$$

where $N$ is absolute viscosity, "$K$" and "$a$" are constants and $M$ is molecular weight. In the present case, $K$ is 1.75 and "$a$" is 0.66, and the following relationship exists between viscosity and calculated molecular weight:

| Viscosity | Molecular weight |
|---|---|
| 1.5 | 23,500 |
| 1.8 | 28,000 |
| 2.2 | 50,000 |
| 2.5 | 69,000 |

1.9 centipoises at 25° C. Twenty parts by weight of the copolymer were dissolved in 80 parts by weight of acetone at room temperature, to form a smooth, clear and viscous solution. This solution was pumped through a spinneret having holes 0.003 inch in diameter into water maintained at 50° C. The fibers were formed at an initial rate of about 10 feet per minute in the warm spinning bath and were stretched about 100 per cent so that they left that bath at about 20 feet per minute. After further washing in water, they were stretched to a total of 10 times their initial length per unit weight of polymer, in steam supplied at about 120° C., and were wound up on cones at 100 feet per minute. These fibers, being hydrophobic, had tenacities both dry and wet of about 3 grams per denier and were capable of about 15 per cent elongation without rupture. Fibers could not be made in this way from copolymers of the same chemical analysis whose standard test solutions in dimethyl formamide had viscosities below 1.5 centipoises, and similar copolymers whose test solutions had viscosities about 2.5 centipoises could not be dissolved to form smooth spinnable solutions in acetone of sufficient concentration to form fibers.

I claim:

1. A composition of matter consisting essentially of a 10 to 20 per cent by weight solution of a copolymer, in which solution acetone is the sole solvent medium and the sole polymeric solute is a copolymer of from 30 to 55 per cent acrylonitrile and complementarily from 70 to 45 per cent vinylidene chloride, the said copolymer being of such molecular weight that a test solution of 0.5 gram of the copolymer in 100 milliliters of dimethyl formamide has a viscosity of from 1.5 to 2.5 centiposes at 25° C.

2. A composition as claimed in claim 1, wherein the copolymer is of such molecular weight that its said test solution has a viscosity of from 1.8 to 2.2 centipoises at 25° C.

3. A composition as claimed in claim 2, wherein the copolymer is one of about 40 per cent acrylonitrile and about 60 per cent of vinylidene chloride, by weight.

4. A composition as claimed in claim 1, wherein the copolymer is one of about 40 per cent acrylonitrile and about 60 per cent of vinylidene chloride, by weight.

References Cited in the file of this patent

UNITED STATES PATENTS

| Number | Name | Date |
|---|---|---|
| 2,456,454 | Signer | Dec. 14, 1948 |